Feb. 1, 1949.  W. C. PLANK  2,460,432
NONINTERMITTENT MOTION-PICTURE PROJECTOR
Filed July 21, 1947
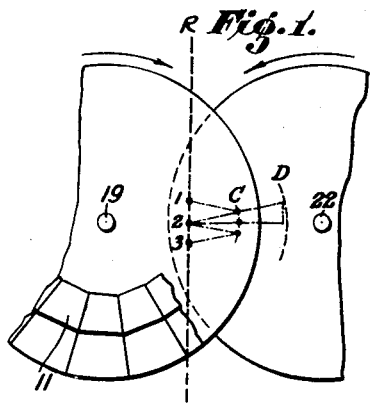
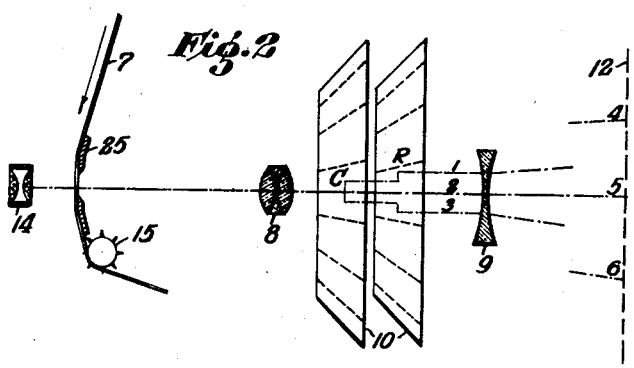
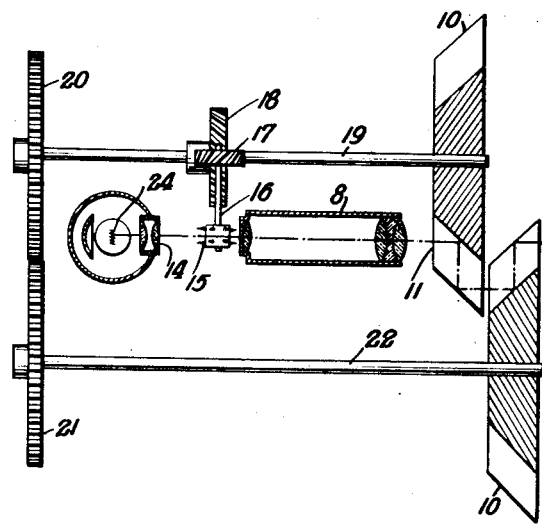
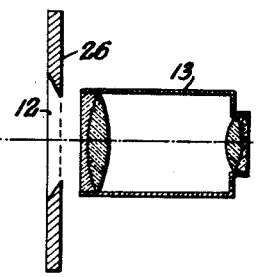
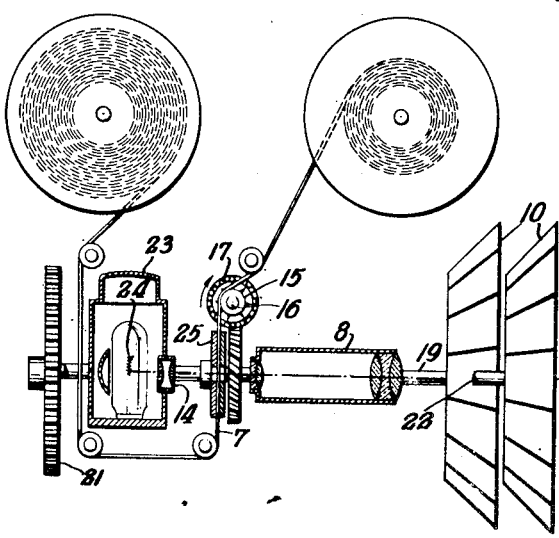
Inventor:
William C. Plank.

Patented Feb. 1, 1949

2,460,432

UNITED STATES PATENT OFFICE 2,460,432

NONINTERMITTENT MOTION-PICTURE PROJECTOR

William C. Plank, Vallejo, Calif.

Application July 21, 1947, Serial No. 762,384

5 Claims. (Cl. 88—16.8)

This improvement relates to motion picture projectors of the non-intermittent type, and consists of certain modifications and improvements in the motion picture machine described in United States Patent No. 1,366,488, granted to me January 25, 1921.

The present improvements relate to means for increasing the illumination, improving the definition, and simplifying the train of gears between the two rotors or wheels of rhombic reflecting prisms. These wheels of rhombic compensating prisms are again employed in the present device; but their disposition with regard to the objective lens, to the film, and to the incident rays in the projector, is different.

In the accompanying drawing Figs. 1 and 2 are diagrams illustrating the manner in which the axial ray is displaced and moved. Fig. 3 is a plan view, and Fig. 4 a side view of the device. Number 10 represents the prism wheels, 20 and 21 are identical gears, mounted respectively on shafts 19 and 22, and adapted to rotate the prisms in opposite directions so that pairs of prisms will move past the optical axis in the same direction as the film frames and in synchronism with the frames; 15 is the sprocket that drives the film and which is geared to the prism wheel shaft 19 by means of the two spiral gears 17 and 18. The light source is at 24, 14 is the condenser lens, 7 is the film, 25 the film gate, 8 is the objective lens, 9 is a negative lens, 13 is a positive lens combination, and 26 is a diaphragm or aperture plate. The inversion of the image caused by the positive lens combination 13, makes necessary the inversion of the order shown in Figs. 1 and 2.

In the former construction the prism wheels were situated between the film and the objective lens, which made necessary the use of an objective lens with a long working distance and a relatively small aperture. In the present improvement the prism wheels are revolved on the outside of the objective lens, and therefore impose no restriction to the working distance or to the aperture of the lens. They are situated between the objective lens and the plane of a small real image of the film, formed by the objective lens. A fundamental difference, therefore, is that in the former device the rhombic prisms were designed to compensate for the movement of the film frames, whereas in the present construction they are designed to compensate for the movement of an image of the film frames, which may be larger or smaller than the frames.

In Fig. 1 the distance 1 to 3 on the line R, represents the height of the image frame for which the prism wheels illustrated in the drawing are adapted. The first prism gives a parallel displacement to the axial ray along the arcuate path C, and the second prism carries it to the positions 1, 2 and 3 along the rectilinear path R. The amount of the rectilinear displacement, measured from the axis, is determined by the sine of the angle of rotation of the prisms, and twice the length of the path between the reflecting surfaces of a prism, as shown at D.

In Fig. 2, the parallel displacement of the axial ray is shown at 1, 2 and 3. The objective lens 8 is adjusted to project a small real image of a film frame so that its height is made equal to the distance 1 to 3, or to the maximum displacement given by the prisms. To show this image on a small screen, the negative lens 9 would have to be temporarily removed. When replaced, the negative lens enlarges the small real image and projects it to a screen at 12. At the screen, the image will remain substantially stationary if the film frames and the compensating prisms be moved downward past the optical axis in synchronism with each other.

Further advantages gained through the present modification may be mentioned. The rhombic prisms are now situated on the longer side of the objective lens, and the effects of their refractive characteristics are thereby reduced, with an improvement in the quality and definition of the image. And as they can now be made of any size or aperture desired, and the size of the image readily varied to fit the displacement of the prisms, an adaptiveness or flexibility has been acquired that the device lacked before. Thus, 8 m. m. and 16 m. m. film can be projected with the prism wheels illustrated, when appropriate changes are made in the sprockets and gears.

And a further gain in the illumination is also brought about by the change in the position of the inner or smaller vertical faces of the rhombic prisms, with respect to the incident rays in the projecting apparatus. In the two wheels of compensating elements, the parallel reflecting surfaces of the rhombic prisms are radially disposed, which necessarily makes the inner vertical faces (11 in Fig. 1) smaller in area than the outer faces. When the outer or larger faces are presented to the incident rays in a projector, a large amount of light is lost by striking upon the side or unpolished surfaces of the prisms; for it can be seen that a beam of parallel rays that will just cover the area of a large outer face cannot all emerge from the smaller inner one. This loss of light is avoided when the position of the rhombic prisms is reversed so that only the inner or smaller faces can receive the incident light.

The exposure, or optically effective interval of the prism elements, is shortened in the present arrangement. The film frames and the prism elements are moved past the optical axis synchronously and in the same direction; but the fact that the objective lens is now situated between them, alters, at least optically, the relation of these motions. The curtailment in the optically effective travel of the prisms, reduces the amount of the sinusoidal movement involved, and permits the employment of an illuminated aperture of less height, with a consequent saving in illumination.

And then, in the present design, there is the more favorable disposition of the prism wheels for making certain optical corrections for the sinusoidal movement introduced by them. In Fig. 2 the negative lens 9 is made to serve a twofold purpose, for it not only enlarges the image, but also serves to rectify the variable motion in the axial ray. To accomplish this latter purpose it is located in the narrowest part of the light beam, that is, where the image of the light source is formed by the objective lens 8. If a light source be used which approaches a point in size, such as that of a concentrated-arc lamp, a practical correction for the sinusoidal movement can be effected by making use of spherical aberration in the negative lens, and the compensative tangental motion introduced. Thus, the axial ray is displaced with a sinusoidal motion at 1, 2 and 3; but due to the rectification of the negative lens, the motion at 4, 5 and 6 on the image plane 12, becomes much more uniform. A second corrective method depends upon the changing visual center, or perspective, of the objective lens as a prism face passes in front of it. This process has always been automatic in the device, but in the present modification, more freedom is allowed in choosing the size of the prisms and the aperture of the objective lens employed.

From the foregoing, it will be seen that as the first real image projected by this device is unavoidably small, the auxiliary lenses used to enlarge it to practical proportions become a necessary and integral part of the complete projector. Either negative or positive lenses may be employed, depending upon whether they are situated inside or outside of the plane of the small real image. A negative lens as shown in Fig. 2 at 9 forms the simplest and most efficient arrangement; but positive lenses have advantages in that the prism wheels can be revolved within a rectilinear compound lens system, which affords better definition, and which is able to project a sharp aperture outline, when the diaphragm or aperture plate is situated in the plane of the first real image, as shown at 26 in Figs. 3 and 4. A combination of a negative lens with the positive lenses is also shown in these figures.

I claim:

1. In a non-intermittent motion picture projector, means to move the film at a uniform velocity past an adjustable objective lens adapted to project a small real image of the film, two wheels comprised of rhombic reflecting prisms disposed so as to receive the light rays from the said objective lens through the smaller or inner faces of the prisms, means to rotate the said prisms past the said objective lens in the same direction as the film to compensate for the motion of the said film, and an auxiliary negative lens situated on the outside of the said prism wheels adapted to enlarge the arrested image.

2. In a non-intermittent motion picture projector, means to move the film at a uniform velocity, two rotary members comprised of rhombic reflecting prisms adapted to displace the axial ray equal amounts along a rectilinear path and disposed so as to receive the incident light rays through the smaller or inner faces of the prisms, means to rotate the said prisms past the optical axis in the same direction as the film, an adjustable objective lens situated between the film and the said rotary members adapted to project images of the film frames through the said rhombic prisms equal in height to the said amount of displacement, and an auxiliary lens situated on the outside of the said rotary members adapted to enlarge the images.

3. In a motion picture projector of the non-intermittent type, the combination of means to move the film past an illuminated aperture at a uniform velocity, an objective lens adapted to project small real images of the moving film frames, two rotary members comprised of reflecting prisms of rhomboidal form so disposed that the light rays from the said objective lens enters through their inner or smaller vertical faces and emerges from the outer or larger faces, means to rotate the said prisms past the said objective lens in the same direction as the film to compensate for the motion of the said real images of the film frames, and an auxiliary lens situated on the outside of the said rotary members adapted to enlarge the arrested images, substantially as described.

4. In a motion picture projector of the non-intermittent type, means to illuminate a film-gate aperture, an objective lens adapted to collect the light rays from the said aperture, two wheels of rhombic reflecting prisms adapted to receive the light rays from the said objective lens through the inner or smaller vertical faces of the prisms, means to rotate the said prisms past the said objective lens to cause a parallel displacement of the axial illuminating ray along a rectilinear path with a variable or sinusoidal movement, and an auxiliary negative lens situated on the outside of the said prism wheels adapted to alter the course of the said axial ray and deflect it on to a screen with a more uniform motion, substantially as described.

5. In a motion picture projector of the non-intermittent type, the combination of two similar wheels of rhombic prisms adapted to receive the incident light rays through the inner or smaller vertical faces of the said prisms, and mounted on two parallel shafts situated on opposite sides of the optical axis, means comprising two identical gears for revolving the said wheels of prisms in opposite directions, a film sprocket geared to one of the said shafts; a lamp house, a film gate, and an objective lens, all situated within the two parallel shafts and between the said identical gears and the prism wheels; and an auxiliary lens system, situated on the outside of the prism wheels, comprising a negative lens, a diaphragm or aperture plate, and two positive lenses, substantially as described.

WILLIAM C. PLANK.

REFERENCES CITED

The following references are of record in the file of this patent:

UNITED STATES PATENTS

| Number | Name | Date |
|---|---|---|
| 1,520,384 | Bauersfeld | Dec. 23, 1924 |
| 2,247,295 | Heinisch | June 24, 1941 |